US012804664B2

(12) United States Patent
Ohara

(10) Patent No.: US 12,804,664 B2
(45) Date of Patent: Nov. 17, 2026

(54) TERMINAL, BASE STATION, AND COMMUNICATION METHOD FOR SWITCHING OF SEARCH SPACE SET OR SKIPPING OF PHYSICAL DOWNLINK CONTROL CHANNEL MONITORING

(71) Applicant: NTT DOCOMO, INC., Tokyo (JP)

(72) Inventor: Tomoya Ohara, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 392 days.

(21) Appl. No.: 18/259,676

(22) PCT Filed: Jan. 18, 2021

(86) PCT No.: PCT/JP2021/001541
§ 371 (c)(1),
(2) Date: Jun. 28, 2023

(87) PCT Pub. No.: WO2022/153551
PCT Pub. Date: Jul. 21, 2022

(65) Prior Publication Data
US 2024/0064754 A1 Feb. 22, 2024

(51) Int. Cl.
*H04W 72/23* (2023.01)
*H04L 5/00* (2006.01)
*H04W 24/08* (2009.01)

(52) U.S. Cl.
CPC .......... *H04W 72/23* (2023.01); *H04L 5/0053* (2013.01); *H04W 24/08* (2013.01)

(58) Field of Classification Search
CPC .......... H04W 72/232; H04W 72/0446; H04W 72/04; H04W 72/085; H04W 72/23; H04W 72/004; H04L 5/0053; H04L 1/08; H04L 5/005
See application file for complete search history.

(56) References Cited

U.S. PATENT DOCUMENTS

2019/0174466 A1* 6/2019 Zhang .................. H04L 5/0057
2020/0120596 A1* 4/2020 Yu .................... H04W 52/0216
2022/0086757 A1* 3/2022 Wong ................ H04W 52/0229
2023/0180249 A1* 6/2023 Bala .................... H04W 52/028 370/329

OTHER PUBLICATIONS

International Search Report issued in PCT/JP2021/001541 on Aug. 31, 2021 (5 pages).
Written Opinion of the International Searching Authority issued in PCT/JP2021/001541 on Aug. 31, 2021 (4 pages).
3GPP TS 38.213 V16.3.0; "3rd Generation Partnership Project; Technical Specification Group Radio Access Network; NR; Physical layer procedures for control (Release 16)"; Sep. 2020 (179 pages).

(Continued)

*Primary Examiner* — Wei Zhao
(74) *Attorney, Agent, or Firm* — Osha Bergman Watanabe & Burton LLP

(57) ABSTRACT

A terminal has: a receiving unit configured to receive information related to a PDCCH (Physical Downlink Control CHannel) monitoring reduction function; and a control unit configured to start and end the PDCCH monitoring reduction function based on the information related to the PDCCH monitoring reduction function.

5 Claims, 4 Drawing Sheets

(56) References Cited

OTHER PUBLICATIONS

3GPP TS 38.331 V16.2.0; "3rd Generation Partnership Project; Technical Specification Group Radio Access Network; NR; Radio Resource Control (RRC) protocol specification (Release 16)"; Sep. 2020 (921 pages).
OPPO; "Discussion on DCI-based power saving adaptation"; 3GPP Tsg Ran WG1 #103-e, R1-2008267; e-Meeting, Oct. 26-Nov. 13, 2020 (7 pages).
Huawei et al.; "Extension(s) to Rel-16 DCI-based power saving adaptation for an active BWP"; 3GPP TSG RAN WG1 Meeting #103-e, R1-2007602; E-meeting, Oct. 26-Nov. 13, 2020 (12 pages).
Spreadtrum Communications; "Discussion on power saving techniques for connected-mode UE"; 3GPP TSG RAN WG1 Meeting #102, R1-2006271; e-Meeting, Aug. 17-28, 2020 (4 pages).
Vivo; "Discussion on DCI-based power saving adaptation in connected mode"; 3GPP TSG RAN WG1#103-e, R1-2007676; e-Meeting, Oct. 26-Nov. 13, 2020 (13 pages).
Office Action issued in Japanese Patent Application No. 2022-575053, dated Sep. 10, 2024 (6 pages).
3GPP TSG RAN WG1#103e; R1-209299; Sony; "On power saving adaption during the DRX active time"; E-meeting, Oct. 26-Nov. 13, 2020 (5 pages).
Office Action issued in Chinese Patent Application No. 202180090114.8, mailed on Jan. 29, 2026 (22 pages).
Office Action issued in Japanese Patent Application No. 2025-016417; Dated Dec. 9, 2025 (5 pages).
Office Action issued in counterpart Chinese Patent Application No. 202180090114.8 mailed on Jul. 18, 2026 (17 pages).

* cited by examiner

TERMINAL, BASE STATION, AND COMMUNICATION METHOD FOR SWITCHING OF SEARCH SPACE SET OR SKIPPING OF PHYSICAL DOWNLINK CONTROL CHANNEL MONITORING

FIELD OF THE INVENTION

The present invention relates to a terminal and a communication method in a wireless communication system.

BACKGROUND OF THE INVENTION

In 3GPP (3rd Generation Partnership Project), a wireless communication scheme called "5G" or "NR" (New Radio) is being discussed in order to realize further increase of system capacity, further increase of data transmission speed, and further decrease of delay in wireless sections (hereinafter this new communication scheme will be referred to as "NR"). In 5G, various wireless technologies and network architectures are being discussed in order to satisfy the requirements of achieving a throughput of 10 Gbps or more and keeping the delay in wireless sections to 1 ms or less (see, for example, Non-Patent Document 1).

In addition, in NR, further enhancement of the saving of power consumption in connected mode is being discussed. For example, reducing PDCCH (Physical Downlink Control CHannel) monitoring while connected DRX (Discontinuous reception) is configured, reducing the power in DCI (Downlink Control Information)-based DRX active period, and so forth are being discussed.

RELATED-ART DOCUMENTS

Non-Patent Documents

[Non-Patent Document 1] 3GPP TS 38.213 V16.3.0 (2020-09)

[Non-Patent Document 2] 3GPP TS 38.331 V16.2.0 (2020-09)

SUMMARY OF THE INVENTION

Technical Problem

Reducing PDCCH monitoring in order to save power consumption is being discussed. However, no specific method is defined as to how to reduce PDCCH monitoring.

The present invention has been made in view of the above, and it is therefore an object of the present invention to save power consumption in a wireless communication system.

Solution to Problem

According to the disclosed technique, a terminal is provided. The terminal includes: a receiving unit configured to receive information related to a PDCCH (Physical Downlink Control CHannel) monitoring reduction function; and a control unit configured to start and end the PDCCH monitoring reduction function based on the information related to the PDCCH monitoring reduction function.

Advantageous Effects of Invention

This disclosure provides a technique for saving power consumption in a wireless communication system.

DETAILED DESCRIPTION OF THE PREFERRED EMBODIMENTS

Hereinafter, an embodiment of the present invention will be described with reference to the accompanying drawings. The embodiment described below is an example, and the embodiments to which the present invention can be applied are not limited to the following embodiment.

In operating the wireless communication system according to the embodiment of the present invention, conventional techniques may be used as appropriate. The conventional techniques include, but are not limited to, for example, conventional LTE. The term "LTE" as used herein shall also have a broad meaning including LTE-Advanced, as well as successor systems of LTE-Advanced (for example, NR), unless specified otherwise.

Also, in the embodiment of the present invention described below, terms that are used in conventional LTE, such as SS (Synchronization Signal), PSS (Primary SS), SSS (Secondary SS), PBCH (Physical Broadcast CHannel), PRACH (Physical Random Access CHannel), PDCCH (Physical Downlink Control CHannel), PDSCH (Physical Downlink Shared CHannel), PUCCH (Physical Uplink Control CHannel), and PUSCH (Physical Uplink Shared CHannel) are used. This is only for convenience of description, and signals, functions, and the like that are similar to these may be referred to by other names. Also, the above terms in NR correspond to NR-SS, NR-PSS, NR-SSS, NR-PBCH, NR-PRACH, and the like. However, signals used in NR will not be always written with the prefix "NR-".

Also, in the embodiment of the present invention, the duplex scheme may be a TDD (Time Division Duplex) scheme, an FDD (Frequency Division Duplex) scheme, or other schemes (including, for example, a flexible duplex scheme).

Also, in the embodiment of the present invention, when a wireless parameter or the like is "configured", this may mean that a predetermined value is configured in advance (that is, "pre-configured"), or that a wireless parameter that is indicated by a base station 10 or a terminal 20 is configured.

Figure 1:
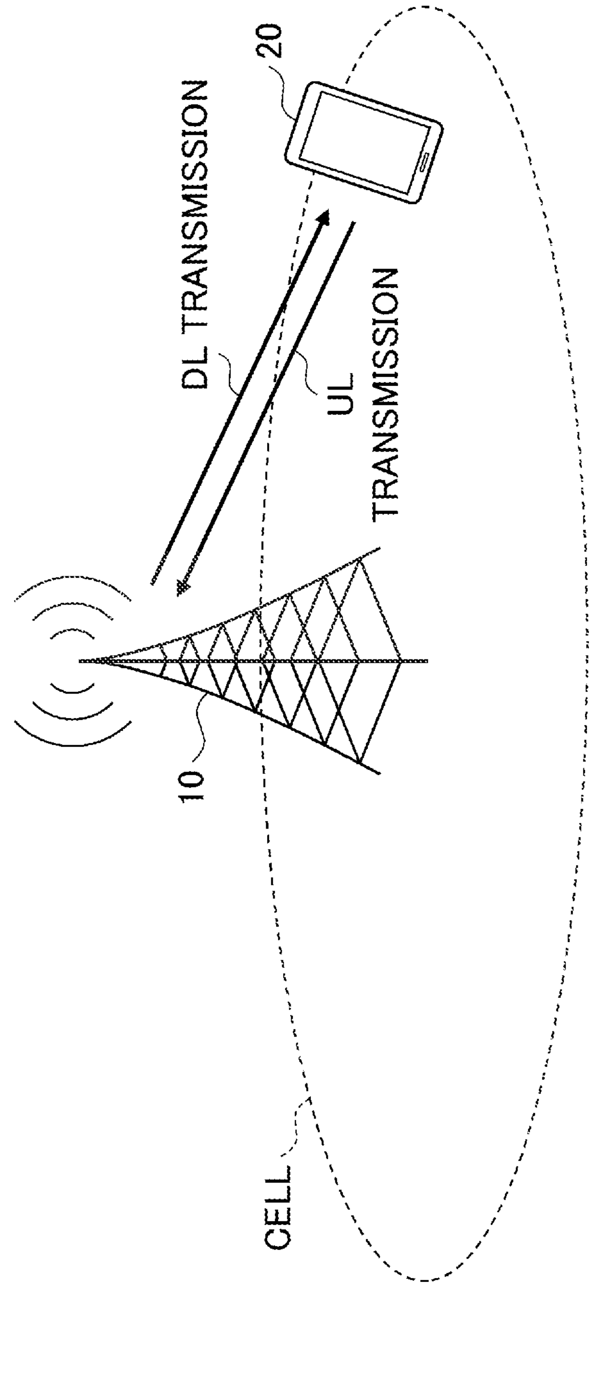
FIG. 1 is a diagram illustrating a wireless communication system according to an embodiment of the present invention.

FIG. 1 is a diagram illustrating a wireless communication system according to the embodiment of the present invention. The wireless communication system according to the embodiment of the present invention includes a base station 10 and a terminal 20, as illustrated in FIG. 1. In FIG. 1, one base station 10 and one terminal 20 are illustrated, but this is an example, and there may be more than one of each.

The base station 10 is a communication device that provides one or more cells and performs wireless communication with the terminal 20. The physical resources of radio signals are defined in the time domain and the frequency domain. The time domain resources may be defined or referred to as OFDM (Orthogonal Frequency Division Multiplexing) symbols, and the frequency domain resources may be defined or referred to as sub-carriers or resource blocks. The TTI (Transmission Time Interval) in the time domain may be a slot, or the TTI may be a subframe.

The base station 10 can perform carrier aggregation to communicate with the terminal 20 by bundling multiple cells (multiple CCs (Component Carriers)). Carrier aggregation uses one PCell (Primary Cell) and one or more SCells (Secondary Cells).

The base station 10 transmits synchronization signals and system information to the terminal 20. The synchronization signals are, for example, NR-PSS and NR-SSS. The system information is transmitted, for example, by NR-PBCH or PDSCH, and is also referred to as broadcast information. As illustrated in FIG. 1, the base station 10 transmits control signals or data in DL (Downlink) to the terminal 20 and receives control signals or data in UL (Uplink) from the terminal 20. Here, what is transmitted by a control channel such as PUCCH and PDCCH is referred to as a control signal, and what is transmitted by a shared channel such as PUSCH and PDSCH is referred to as data, but these names are only examples.

The terminal 20 is a communication device with wireless communication functions, such as a smartphone, a cellular phone, a tablet, a wearable terminal, and an M2M (Machine-to-Machine) communication module. As illustrated in FIG. 1, the terminal 20 utilizes various communication services provided by a wireless communication system by receiving control signals or data in DL from the base station 10 and transmitting control signals or data in UL to the base station 10. Note that the terminal 20 may be referred to as a UE, and the base station 10 may be referred to as a gNB.

The terminal 20 can perform carrier aggregation to communicate with the base station 10 by bundling multiple cells (multiple CCs). Carrier aggregation uses one primary cell and one or more secondary cells. Also, PUCCH-SCell with PUCCH may be used.

Now, in NR, enhancement of the saving of power consumption in connected mode is being discussed. For example, reduction of PDCCH (Physical Downlink Control CHannel) monitoring while connected DRX (Discontinuous reception) is configured, reduction of power during DCI (Downlink Control Information)-based DRX active period, and so forth are being discussed.

Operations related to the above reduction of PDCCH monitoring include switching of the search space set group and skipping of PDCCH monitoring for a certain period of time, which are being discussed.

Accordingly, switching of the search space set or the search space set group and/or skipping of PDCCH monitoring for a certain period of time may be indicated from the base station 10 to the terminal 20. Furthermore, switching of the search space set or the search space set group, and/or the timing to start and/or end the application of PDCCH monitoring skipping for a certain period of time and/or the duration of the application may be specified, or may be indicated from the base station 10 to the terminal 20.

Figure 2:
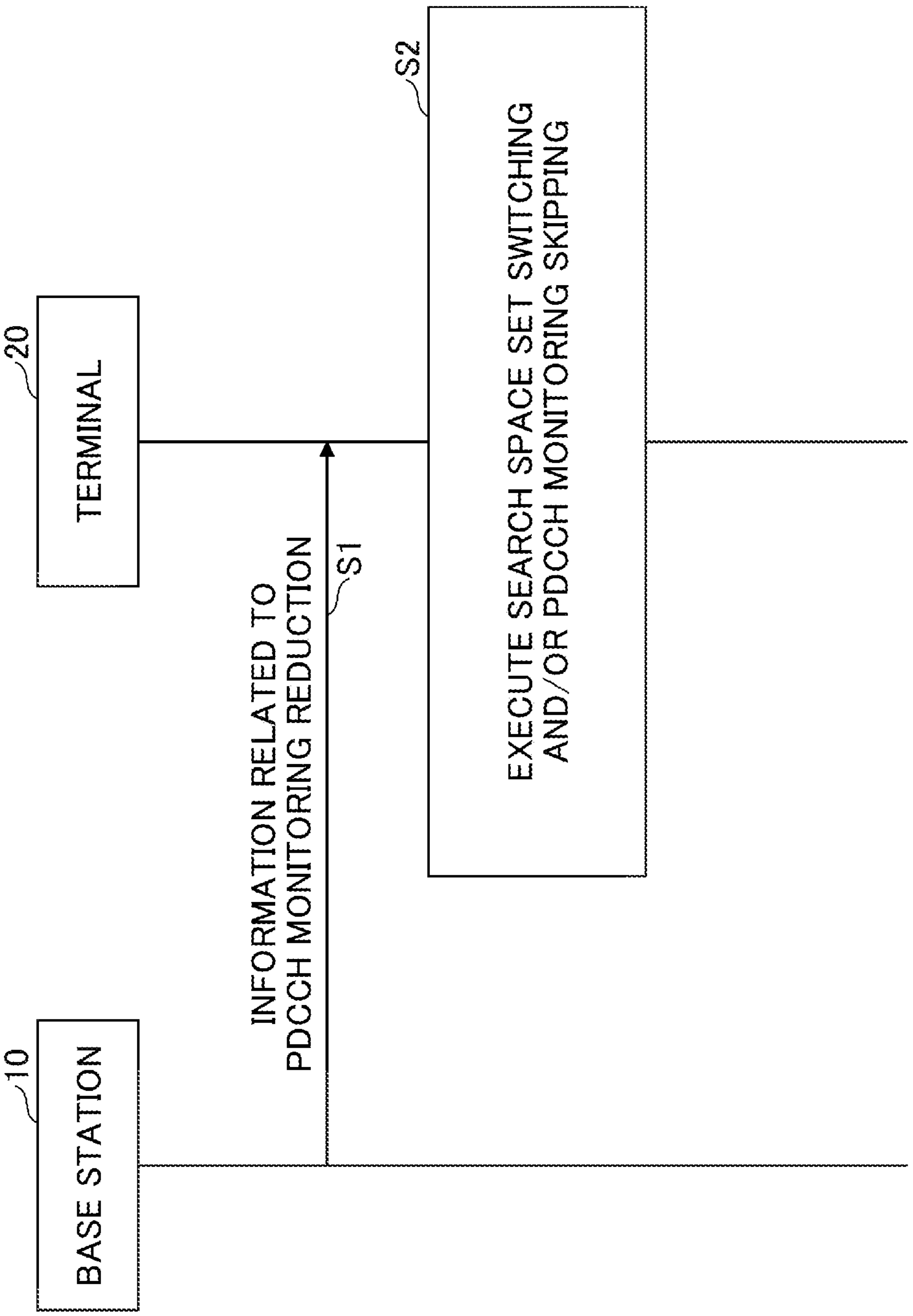
FIG. 2 is a sequence diagram for explaining an example of monitoring according to an embodiment of the present invention.

FIG. 2 is a sequence diagram illustrating an example of monitoring according to the embodiment of the present invention. In step S1, the base station 10 transmits information related to PDCCH monitoring reduction to the terminal 20. The information related to PDCCH monitoring reduction may be information that triggers PDCCH monitoring, or may be information about the timing of the start of the application of the PDCCH monitoring reduction function and/or the timing of the end of the application. In subsequent step S2, based on the information related to PDCCH monitoring reduction, the terminal 20 switches the search space set and/or skips PDCCH monitoring (that is, executes the PDCCH monitoring reduction function).

Note that, in this disclosure, switching of the search space set or the search space set group and/or skipping of PDCCH monitoring for a certain period of time are referred to as "PDCCH monitoring reduction functions" (including functions similar to these). The present disclosure may be applied to switching of the search space set or the search space set group and/or skipping of PDCCH monitoring for a certain period of time. Alternatively, the present disclosure may be applied to other PDCCH monitoring reduction functions besides the switching of the search space set or the search space set group and/or skipping of PDCCH monitoring for a certain period of time. PDCCH monitoring reduction functions may correspond to other functions whereby PDCCH monitoring can be reduced.

Any one or more of following (1) to (4) may be applied as PDCCH monitoring reduction functions:

(1) Switching of the search space set or the search space set group may be indicated.

(2) Skipping of PDCCH monitoring for a certain period of time may be indicated.

(3) Switching of the search space set or the search space set group and skipping of PDCCH monitoring for a certain period of time may be indicated at the same time. The indication may be sent by using, for example, a single DCI (Downlink Control Information), MAC-CE (Media Access Control-Control Element), or the like.

(4) Other PDCCH monitoring reduction functions may be indicated.

The switching of the search space set or the search space set group may refer to a function of switching the search space set group, a function of switching the search space set, or a function of switching any parameter related to the search space set.

With respect to the skipping of PDCCH monitoring for a certain period of time, the time duration of skipping PDCCH monitoring may be indicated or specified, the number of times PDCCH monitoring is to be skipped (that is, the time duration varies depending on the PDCCH monitoring period) may be indicated or specified, or the duration of skipping PDCCH monitoring may be indicated or specified based on other operations (for example, the DRX cycle).

In above step S1, the timing to start applying PDCCH monitoring functions or an application delay may be indicated or specified. For example, the application-starting slot and/or symbol, the number of application-delaying slots and/or symbols, and so forth may be indicated or specified.

Furthermore, in step S1 above, the application-starting timing or the application delay may be indicated or specified based on the reception timing of an explicit or implicit indication for triggering PDCCH monitoring reduction functions.

Also, in step S1 above, the application-starting timing or the application delay may be indicated or specified based on the timing of an ACK transmitted by the terminal 20. This ACK may include one of or both of following (1) and (2):

(1) The ACK may include all of the ACKs the terminal 20 is expected to or scheduled to transmit in the cell. That is, ACKs in response to DL data received before or after the indication of PDCCH monitoring reduction functions may be included.

(2) The ACK may include an ACK in response to the indication of PDCCH monitoring reduction functions.

For example, it may be indicated or specified that PDCCH monitoring reduction functions are to be applied immediately after the ACK. Alternatively, it may be indicated or specified that PDCCH monitoring reduction functions are to be applied after a certain period of time from the ACK.

Furthermore, in above step S1, whether or not PDCCH monitoring reduction functions are to be applied during a period between the reception of the indication for triggering PDCCH monitoring reduction functions and the timing of the ACK transmitted by the terminal 20, may be indicated or specified.

For example: whether or not the PDCCH monitoring is to be skipped during a period between the indication of PDCCH monitoring reduction functions and the timing of an ACK transmitted by the terminal 20 may be indicated; or, skipping of PDCCH monitoring may be applied, from immediately after the transmission timing of the ACK, or from a certain period of time after the transmission timing of the ACK.

For example, it may be indicated or specified that the operation up to the timing of the ACK transmission by the terminal 20, is different from the operation that is performed: from immediately after the transmission timing of the ACK; or from a certain period of time after the transmission timing of the ACK.

Note that, with respect to the application-starting timing or the application delay of PDCCH monitoring reduction functions, different application-starting timings or application delays may be specified under different conditions. For example, the application-starting timing or the application delay may be determined based on the type of DCI format, the values of parameters that are indicated, and so forth.

Also, in a case where a plurality of PDCCH monitoring reduction functions are applied, different application-starting timings or application delays may be specified for corresponding functions, or a common application-starting timing or application delay may be specified.

Also, in a case where a plurality of PDCCH monitoring reduction functions are applied, the timing to start applying one function may be specified based on the timing to start/finish applying another function, or on the application duration. For example, in a case where PDCCH monitoring skipping and search space set or search space set group switching are applied, the application of search space set or search space set group switching may be started from the timing of the end of the application of PDCCH monitoring skipping.

Also, in step S1 above, the application duration or the timing of the end of the application, of PDCCH monitoring reduction functions may be indicated or specified. For example, the number of slots and/or symbols to be applied to PDCCH monitoring reduction functions, and the slot and/or the number of symbols to be applied to the end of the application may be indicated or specified.

PDCCH monitoring-related parameters and/or operations to be applied during an indicated or specified period, may be indicated or specified. For example, the PDCCH monitoring period or the like that is applied during a period of several slots, may be indicated. Additionally, other applicable parameters (for example, the maximum number of MIMO layers) may be indicated.

Furthermore, in step S1 above, the application duration or the timing of the end of the application, may be indicated or specified based on the reception timing of the explicit or implicit indication for triggering PDCCH monitoring reduction functions.

For example, it may be indicated or specified that the application period is X slots from the reception timing of the PDCCH monitoring reduction function-triggering indication, or that the timing of the end of the application is Y slots after the reception timing of the PDCCH monitoring reduction function-triggering indication. In other words, in a case where the application-starting timing is indicated or specified based on the timing of an ACK transmitted by the terminal 20, the actual application duration of the functions may vary based on the timing of the ACK transmitted by the terminal 20.

Also, the application duration or the timing of the end of the application, may be indicated or specified based on the above timing of an ACK transmitted by the terminal 20.

For example, it may be indicated or specified that the application duration is X slots from the timing of an ACK transmitted by the terminal 20, or the timing of the end of the application is after Y slots from the timing of an ACK transmitted by the terminal 20. That is, in a case where the application-starting timing is indicated or specified based on the reception timing of the PDCCH monitoring reduction function-triggering indication by the terminal 20, the actual application duration of the functions may vary based on the timing of an ACK transmitted by the terminal 20.

Note that, with respect to the application duration of or the timing of the end of the application of, PDCCH monitoring reduction functions, different application durations or different application-ending timings may be specified under different conditions. For example, the application duration or the application-ending timing may be specified based on the type of DCI format, the values of parameters that are indicated, and so forth.

Also, in a case where a plurality of PDCCH monitoring reduction functions are applied, different application durations or different application-ending timings may be specified for corresponding functions, or a common application duration or application-ending timing may be specified.

Also, in a case where a plurality of PDCCH monitoring reduction functions are applied, the application duration or the application-ending timing of one function may be specified based on the timing to start/finish applying another function, or the application duration thereof. For example, in a case where PDCCH monitoring skipping and search space set or search space set group switching are applied, the application of search space set or search space set group switching may be finished at the timing of the start of the application of PDCCH monitoring skipping.

According to the above-described embodiment, by having the start and end of the application of PDCCH monitoring reduction functions indicated or specified, the terminal 20 can execute PDCCH monitoring reduction functions.

That is, power consumption can be saved in a wireless communication system.

(Device Structure)

Next, an example functional structure of the base station 10 and the terminal 20 for performing the processes and operations described above will be described. The base station 10 and the terminal 20 include functions for executing the embodiment described above. However, each of the base stations 10 and the terminal 20 may include only part of the functions of the embodiment.

<Base Station 10>

Figure 3:
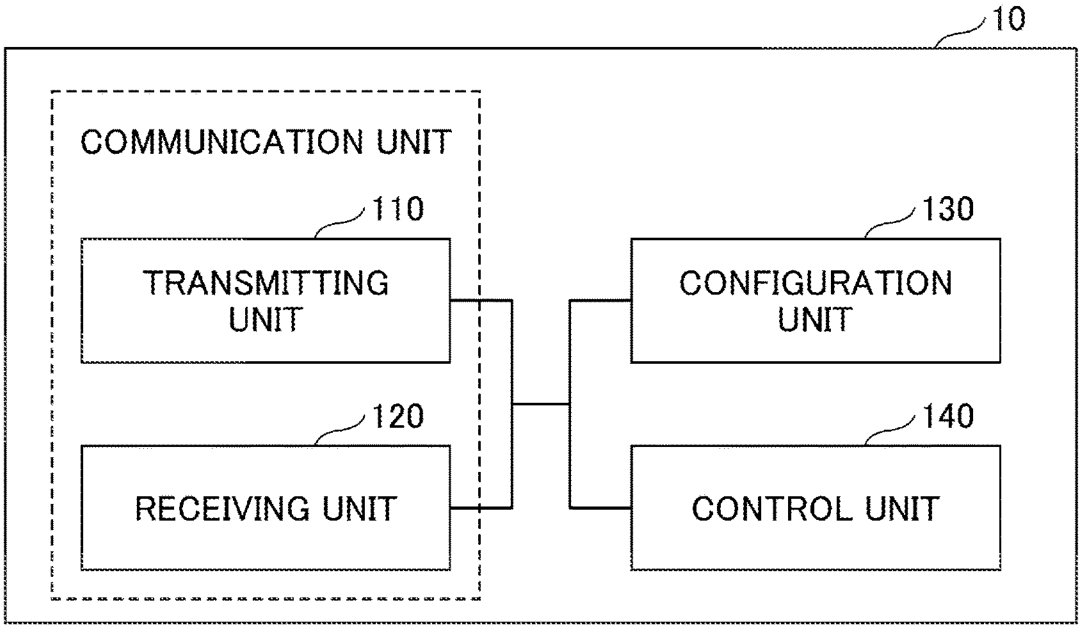
FIG. 3 is a diagram illustrating an example functional structure of a base station 10 according to an embodiment of the present invention.

FIG. 3 is a diagram illustrating an example functional structure of the base station 10. As illustrated in FIG. 3, the base station 10 includes a transmitting unit 110, a receiving unit 120, a configuration unit 130, and a control unit 140. The functional structure illustrated in FIG. 3 is only one example. If the operation according to the embodiment of the present invention can be performed, any functional categories and any functional unit names may be used. The transmitting unit 110 and the receiving unit 120 may be referred to as communication units.

The transmitting unit 110 includes a function for generating signals to be transmitted to the terminal 20 side and transmitting the signals wirelessly. The receiving unit 120 includes a function of receiving various signals transmitted from the terminal 20 and acquiring, for example, information about the higher layers from the received signals. The transmitting unit 110 has a function to transmit NR-PSS, NR-SSS, NR-PBCH, DL/UL control signals, DL data, and the like to the terminal 20. Furthermore, the transmitting unit 110 transmits the configuration information described in the embodiment and the like.

The configuration unit 130 stores the configuration information prepared in advance and various configuration information to be transmitted to the terminal 20 in a storage device, and reads the information from the storage device as needed. The control unit 140 controls, for example, resource allocation, the entirety of the base station 10, and so forth. Note that a functional unit relating to signal transmission in the control unit 140 may be included in the transmitting unit 110, and a functional unit relating to signal reception in the control unit 140 may be included in the receiving unit 120. The transmitting unit 110 and the receiving unit 120 may be referred to as a transmitter and a receiver, respectively.

<Terminal 20>

Figure 4:
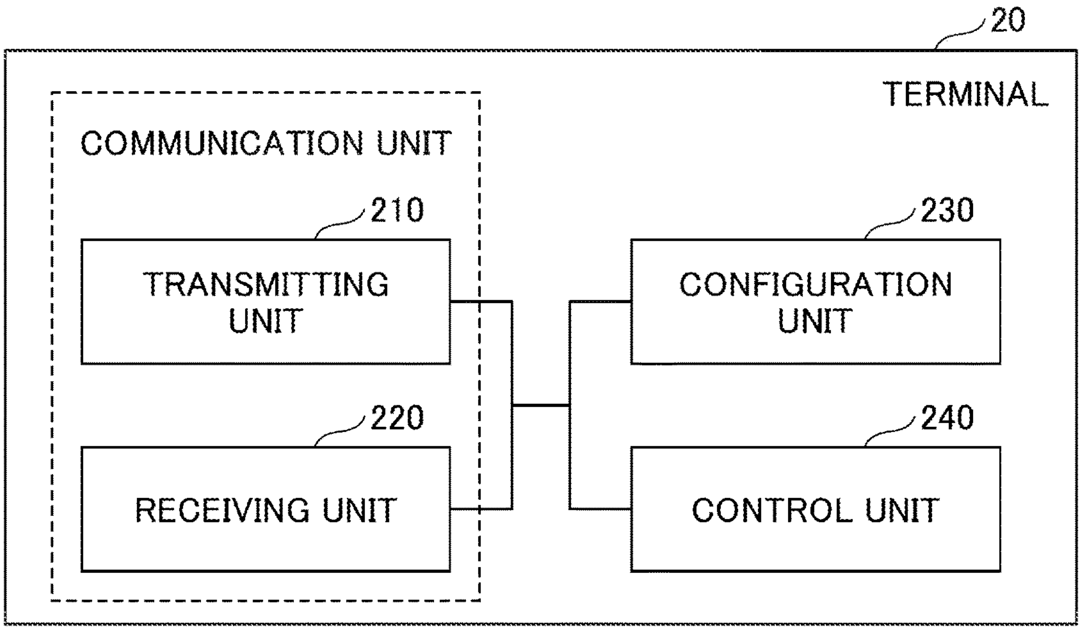
FIG. 4 is a diagram illustrating an example functional structure of a terminal 20 according to an embodiment of the present invention.

FIG. 4 is a diagram illustrating an example functional structure of the terminal 20. As illustrated in FIG. 4, the terminal 20 includes a transmitting unit 210, a receiving unit 220, a configuration unit 230, and a control unit 240. The functional structure illustrated in FIG. 4 is only one example. If the operation according to the embodiments of the present invention can be performed, any functional categories and functional unit names may be used. The transmitting unit 210 and the receiving unit 220 may be referred to as communication units.

The transmitting unit 210 creates transmission signals from the transmission data and transmits the transmission signals wirelessly. The receiving unit 220 receives various signals wirelessly and acquires signals of higher layers from the received signal of the physical layer. The transmitting unit 210 transmits HARQ-ACK, and the receiving unit 220 receives the configuration information described in the embodiment.

The configuration unit 230 stores various configuration information received from the base station 10 by the receiving unit 220 in the storage device, and reads the stored configuration information from the storage device as needed. The configuration unit 230 also stores the configuration information that is prepared in advance. The control unit 240 controls the entire terminal 20 including control relating to signal transmission and reception. Note that a functional unit relating to signal transmission in the control unit 240 may be included in the transmitting unit 210, and a functional unit relating to signal reception in the control unit 240 may be included in the receiving unit 220. Also, the transmitting unit 210 and the receiving unit 220 may be referred to as a transmitter and a receiver, respectively.

(Hardware Structure)

The block diagrams (FIG. 3 and FIG. 4) used in the description of the above embodiments illustrate blocks of functional units. These functional blocks (components) are implemented by any combination of hardware and/or software. In addition, the method of implementing each functional block is not particularly limited. That is, each functional block may be implemented by using a single device that is physically or logically combined, or two or more devices that are physically or logically separated may be directly or indirectly connected (for example, by using a cable, radio, etc.) and each functional block may be implemented using these multiple devices. The functional blocks may be implemented by combining software with the device or devices.

The functions include, but are not limited to, judgment, determination, decision, calculation, computation, processing, derivation, research, search, verification, reception, transmission, output, access, resolution, selection, choosing, establishment, comparison, assumption, expectation, deeming, broadcasting, notifying, communicating, forwarding, configuring, reconfiguring, allocating, mapping, and assigning. For example, a functional block (component) that works a transmission function is referred to as a transmitting unit or a transmitter. In either case, as described above, the method of implementation is not particularly limited.

Figure 5:
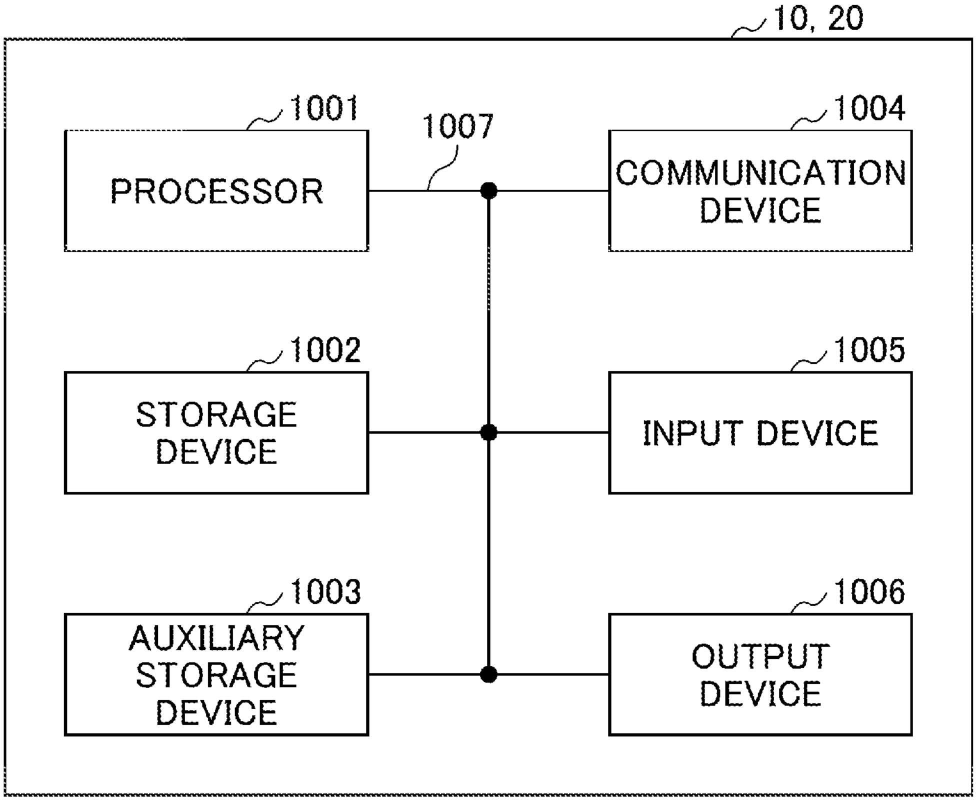
FIG. 5 is a diagram illustrating an example hardware structure of the base station 10 or the terminal 20 according to an embodiment of the present invention.

For example, the base station 10, the terminal 20, and so forth, according to the embodiment of the present disclosure may function as a computer for processing the wireless communication method of the present disclosure. FIG. 5 is a diagram illustrating an example hardware structure of the base station 10 and the terminal 20 according to an embodiment of the present disclosure. The base station 10 and the terminal 20 described above may be physically configured as a computer device including a processor 1001, a storage device 1002, an auxiliary storage device 1003, a communication device 1004, an input device 1005, an output device 1006, a bus 1007, and the like.

In the following description, the term "apparatus" can be read as circuit, device, unit, and so forth. The hardware structure of the base station 10 and the terminal 20 may be configured to include one or more of the devices illustrated in the drawings or may be configured without some of the devices.

The functions of the base station 10 and the terminal 20 are realized by performing operations by the processor 1001 by reading predetermined software (programs) on hardware such as the processor 1001 and the storage device 1002, and controlling communication by the communication device 1004 and controlling at least one of reading and writing of data in the storage device 1002 and the auxiliary storage device 1003.

The processor 1001 operates, for example, an operating system to control the entire computer. The processor 1001 may be composed of a central processing unit (CPU) including an interface with peripheral devices, a control device, an arithmetic device, a register, and the like. For example, the above-described control unit 140, control unit 240, and the like may be implemented by the processor 1001.

The processor 1001 reads out programs (program codes), software modules, data, or the like from at least one of the auxiliary storage device 1003 and the communication device 1004 to the storage device 1002, and performs various processing in accordance with the above. As for the programs, programs that cause the computer to execute at least part of the operation described in the above embodiment may be used.

For example, the control unit 140 of the base station 10 illustrated in FIG. 3 may be stored in the storage device 1002 and implemented by control programs operating in the processor 1001. For example, the control unit 240 of the terminal 20 illustrated in FIG. 4 may be stored in the storage device 1002 and implemented by control programs operating in the processor 1001. Although the foregoing processes have been described and executed by one processor 1001, they may be executed simultaneously or sequentially by two or more processors 1001. The processor 1001 may be implemented by one or more chips. The programs may be transmitted from the network via a telecommunication line.

The storage device 1002 is a computer-readable recording medium and may be composed of at least one of, for example, a ROM (Read Only Memory), an EPROM (Erasable Programmable ROM), an EEPROM (Electrically Erasable Programmable ROM), a RAM (Random Access Memory), and the like. The storage device 1002 may be referred to as a register, cache, main memory (main storage device), or the like. The storage device 1002 can store programs (program codes), software modules, and so forth, executable to implement the communication method according to the embodiment of the present disclosure.

The auxiliary storage device 1003 is a computer-readable recording medium and may be composed of at least one of an optical disk, such as a CD-ROM (Compact Disc ROM), a hard disk drive, a flexible disk, a magneto-optical disk (for example, a compact disk, a digital versatile disk, a Blu-ray disk (registered trademark), etc.), a smart card, a flash memory (for example, a card, a stick, a key drive), a floppy disk (registered trademark), a magnetic strip, and the like. The storage medium described above may be, for example, a database, a server, or other suitable medium that includes at least one of a storage device 1002 and an auxiliary storage device 1003.

The communication device 1004 is hardware (a transceiving device) for performing communication between computers via at least one of a wired network and a wireless network, and is also referred to as a network device, a network controller, a network card, a communication module, or the like. The communication device 1004 may be composed of a high frequency switch, a duplexer, a filter, a frequency synthesizer, or the like, for example, to implement at least one of frequency division duplex (FDD) and time division duplex (TDD). For example, the transmitting/receiving antenna, the amplifier unit, the transceiving unit, the transmission line interface, and the like may be implemented by the communication device 1004. The transceiving unit may be physically or logically isolated, respective implementations of a transmitting unit and a receiving unit.

The input device 1005 is an input device (for example, a keyboard, a mouse, a microphone, a switch, a button, a sensor, etc.) that accepts external input. The output device 1006 is an output device (for example, a display, a speaker, an LED lamp, etc.) that implements external output. The input device 1005 and the output device 1006 may have an integral structure (for example, a touch panel).

Each device, such as the processor 1001 and the storage device 1002, is connected by a bus 1007 for communicating information. The bus 1007 may be constructed using a single bus or may be constructed using different buses between devices.

The base station 10 and the terminal 20 may also include hardware such as a microprocessor, a digital signal processor (DSP), an ASIC (Application Specific Integrated Circuit), a PLD (Programmable Logic Device), an FPGA (Field Programmable Gate Array), and so forth, and some or all of the functional blocks may be implemented by the hardware. For example, the processor 1001 may be implemented using at least one of these hardware components.

Summary of Embodiment

As described above, according to the embodiment of the present invention, a terminal is provided. The terminal has: a receiving unit configured to receive information related to a PDCCH (Physical Downlink Control CHannel) monitoring reduction function; and a control unit configured to start and end the PDCCH monitoring reduction function based on the information related to the PDCCH monitoring reduction function.

According to the above configuration, by having the start and end of the application of PDCCH monitoring reduction functions indicated or specified, the terminal 20 can execute PDCCH monitoring reduction functions. In other words, it is possible to save power consumption in a wireless communication system.

The above PDCCH monitoring reduction function may be at least one of: switching of the search space set or the search space set group; and skipping of PDCCH monitoring for a certain period of time. According to the above configuration, by having the start and end of the application of PDCCH monitoring reduction functions indicated or specified, the terminal 20 can execute PDCCH monitoring reduction functions.

The above control unit may start or end the PDCCH monitoring reduction function based on the timing at which the information related to the PDCCH monitoring reduction function is received. According to the above configuration, by having the start and end of the application of PDCCH monitoring reduction functions indicated or specified, the terminal 20 can execute PDCCH monitoring reduction functions.

The above control unit may start or end the PDCCH monitoring reduction function based on the timing at which a response in response to the reception of the information related to the PDCCH monitoring reduction function is transmitted. According to the above configuration, by having the start and end of the application of PDCCH monitoring reduction functions indicated or specified, the terminal 20 can execute PDCCH monitoring reduction functions.

The above information related to the PDCCH monitoring reduction function may include information that indicates whether or not the PDCCH monitoring reduction function is to be applied during a period between the reception of the information related to the PDCCH monitoring reduction function and transmission of a response in response to the reception of the information related to the PDCCH monitoring reduction function. According to the above configuration, by having the start and end of the application of PDCCH monitoring reduction functions indicated or specified, the terminal 20 can execute PDCCH monitoring reduction functions.

Furthermore, according to the embodiment of the present invention, a communication method for execution by a terminal is provided. The communication method includes: receiving information related to a PDCCH (Physical Downlink Control CHannel) monitoring reduction function; and starting and ending the PDCCH monitoring reduction function based on the information related to the PDCCH monitoring reduction function.

According to the above configuration, by having the start and end of the application of PDCCH monitoring reduction functions indicated or specified, the terminal 20 can execute PDCCH monitoring reduction functions. In other words, it is possible to save power consumption in a wireless communication system.

Notes on Embodiment

An example embodiment of the present invention has been described above, but the disclosed invention is not limited to the above embodiment, and those skilled in the art would understand that there may be various modified examples, revised examples, alternative examples, substitution examples, and the like. In order to facilitate understanding of the invention, specific numerical values have been used for description, but the numerical values are merely examples, and any suitable values may be used unless otherwise specified. The classification of items in the above description is not essential to the present invention. Matters described as two or more items may be combined if necessary, and a matter described as one item may be applied to another item (as long as there is no contradiction). The boundary between functional units or processing units in a functional block diagram does not necessarily correspond to the boundary between physical parts. Operations of a plurality of functional units may be performed physically by one component, or an operation of one functional unit may be physically performed by a plurality of parts. In the processing procedure described in the embodiment, the order of the processes may be changed as long as there is no contradiction. For the sake of convenience of processing description, the base station 10 and the terminal 20 are described using functional block diagrams, but such devices may be implemented by hardware, software, or a combination thereof. Software executed by the processor included in the base station 10 according to the embodiment of the present invention and software executed by the processor included in the terminal 20 according to the embodiment of the present invention may be stored in a RAM (Random Access Memory), a flash memory, a ROM (Read-Only Memory), an EPROM, an EEPROM, a register, an HDD (Hard Disk Drive), a removable disk, a CD-ROM, a database, a server, or any other appropriate storage medium.

Furthermore, notification of information is not limited to the aspect or embodiment described in the present disclosure and may be provided by using any other method. For example, the notification of information may be provided by physical layer signaling (for example, DCI (Downlink Control Information) or UCI (Uplink Control Information)), higher layer signaling (for example, RRC (Radio Resource Control) signaling, MAC (Medium Access Control) signaling, broadcast information (MIB (Master Information Block), SIB (System Information Block), etc.), other signals, or a combination thereof. Furthermore, RRC signaling may be referred to as an RRC message and may be, for example, an RRC connection setup message, an RRC connection reconfiguration message, or the like.

Each aspect and embodiment described in the present disclosure may be applied to at least one of LTE (Long Term Evolution), LTE-A (LTE-Advanced), SUPER 3G, IMT-Advanced, 4G (4th Generation mobile communication system), 5G (5th Generation mobile communication system), FRA (Future Radio Access), NR (New Radio), W-CDMA (registered trademark), GSM (registered trademark), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), a system using any other appropriate system, and next generation systems extended based on these standards. Furthermore, a plurality of systems (for example, a combination of at least one of LTE and LTE-A with 5G) may be combined to be applied.

The order of the processing procedures, the order of the sequences, the order of the flowcharts, and the like of the respective aspects/embodiments described in this specification may be changed, provided that there is no contradiction. For example, the method described in the present disclosure presents elements of various steps with an example order and is not limited to the presented, specific order.

In this specification, a specific operation to be performed by the base station 10 may be performed by an upper node in some cases. In the network including one or more network nodes including the base station 10, various operations performed for communication with the terminal 20 can be obviously performed by at least one of the base station 10 and any network node (for example, an MME, an S-GW, or the like is considered, but it is not limited thereto) other than the base station 10. A case has been shown above in which there is one network node other than the base station 10. The one network node may be a combination of a plurality of other network nodes (for example, MME and S-GW).

Information, a signal, or the like described in the present disclosure may be output from a higher layer (or from a lower layer) to a lower layer (or to a higher layer). Information, a signal, or the like described in the present disclosure may be input and output via a plurality of network nodes.

Input and output information and the like may be stored in a specific place (for example, a memory), or may be managed by using a management table. Input and output information and the like may be overwritten, updated, or additionally written. Output information and the like may be deleted. Input information and the like may be transmitted to other devices.

The determination in the present disclosure may be made in accordance with a value (0 or 1) represented by one bit, may be made in accordance with a Boolean value (Boolean: true or false), or may be made by a comparison of numerical values (for example, a comparison with a predetermined value).

Software should be broadly interpreted to mean a command, a command set, a code, a code segment, a program code, a program, a subprogram, a software module, an application, a software application, a software package, a routine, a subroutine, an object, an executable file, an execution thread, a procedure, a function, and the like, regardless of whether software is called software, firmware, middleware, a microcode, a hardware description language, or any other name.

Furthermore, software, commands, information, and the like may be transmitted and received via a transmission medium. For example, when software is transmitted from a web site, a server, or any other remote source using a wired technology (such as a coaxial cable, a fiber optic cable, a twisted pair, or a DSL (Digital Subscriber Line)) and a radio technology (such as infrared rays or a microwave), at least one of these wired technology and radio technology is included in a definition of a transmission medium.

Information, signals, and the like described in the present disclosure may be expressed using any one of a variety of different techniques. For example, data, instructions, commands, information, signals, bits, symbols, chips, and the like which are mentioned throughout the above description may be expressed by voltages, currents, electromagnetic waves, magnetic fields or magnetic particles, optical fields or photons, or any combination thereof.

The terms described in the present disclosure and the terms necessary for understanding the present disclosure may be replaced with terms having the same or similar meanings. For example, at least one of a channel and a symbol may be a signal (signaling). Furthermore, a signal may be a message. Furthermore, a component carrier (CC: Component Carrier) may be referred to as a "carrier frequency", a "cell", a "frequency carrier", or the like.

The terms "system" and "network" used in the present disclosure are interchangeable.

Furthermore, the information, parameters, and the like described in the present disclosure may be expressed by using absolute values, may be expressed by using relative values from predetermined values, or may be expressed by using any other corresponding information. For example, the radio resources may be those indicated by indices.

The names used for the above-described parameters are not limited names in any point of view. Furthermore, mathematical formulas or the like using the parameters may be different from those explicitly disclosed in the present disclosure. Since various channels (for example, PUSCH, PUCCH, PDCCH, etc.) and information elements can be identified by any suitable names, various names assigned to the various channels and the information elements are not limited names in any point of view.

In the present disclosure, the terms "base station (BS: Base Station)", "radio base station", "fixed station", "NodeB", "eNodeB (eNB)", "gNodeB (gNB)", "access point", "transmission point", "reception point", "transmission/reception point", "cell", "sector", "cell group", "carrier", "component carrier", and the like can be used interchangeably. The base station may also be referred to by a term such as a macrocell, a small cell, a femtocell, and a picocell.

The base station can accommodate one or more (for example, three) cells. In a case in which the base station accommodates a plurality of cells, the entire coverage area of the base station can be partitioned into a plurality of small areas, and each small area can provide a communication service through a base station subsystem (for example, a small indoor base station (RRH: Remote Radio Head)). The term "cell" or "sector" refers to the whole or a part of the coverage area of at least one of the base station and the base station subsystem that performs a communication service in the coverage.

In the present disclosure, the terms "mobile station (MS: Mobile Station)", "user terminal", "user equipment (UE)", "terminal", and the like can be used interchangeably.

The mobile station may be referred to, by a person ordinarily skilled in the art, as a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, a remote terminal, a handset, a user agent, a mobile client, a client, or some other suitable terms.

At least one of the base station and the mobile station may be also referred to as a transmission device, a receiving device, a communication device, or the like. At least one of the base station and the mobile station may be a device installed in a mobile body, a mobile body itself, or the like. The mobile body may be a vehicle (for example, a car, an airplane, etc.), an unmanned body that moves (for example, a drone, an autonomous car or the like), or a robot (manned type or unmanned type). At least one of the base station and the mobile station includes a device that need not move during communication operation. For example, at least one of the base station and the mobile station may be an Internet of Things (IoT) device such as a sensor.

Furthermore, the base station in the present disclosure may be replaced by the user terminal. For example, various aspects/embodiments of the present disclosure may be applied to a configuration in which communication between the base station and the user terminal is replaced by communication between multiple terminals 20 (such communication may be referred to as D2D (Device-to-Device), V2X (Vehicle-to-Everything), etc.). In this case, the terminals 20 may have and perform the functions the base station 10 described above has. The phrases "uplink" and "downlink" may also be replaced by phrases corresponding to terminal-to-terminal communication (for example, "side"). For example, an uplink channel, a downlink channel, or the like may be replaced by a side channel.

Similarly, the user terminal in the present disclosure may be replaced with the base station. In this case, the base station may have the functions of the above-described user terminal.

The terms "determination (determining)" and "decision (determining)" used in the present specification may include various types of operations. The "determination" and "decision" may include deeming "judging", "calculating", "computing", "processing", "deriving", "investigating", "looking up (for example, searching in a table, a database, or another data structure)", "searching", "inquiring", or "ascertaining" as "determining" and/or "deciding". Furthermore, the "determination" and "decision" may include deeming "receiving (for example, receiving information)", "transmitting (for example, transmitting information)", "inputting", "outputting", or "accessing (for example, accessing data in a memory)" as "determining" and/or "deciding". Furthermore, the "determination" and "decision" may include deeming "resolving", "selecting", "choosing", "establishing", or "comparing" as "determining" and/or "deciding". Namely, the "determination" and "decision" may include deeming an operation as "determining" and/or "deciding". Furthermore, "determining" may be replaced with "assuming", "expecting", "considering", or the like.

The terms "connected", "coupled", or variations thereof may mean any direct or indirect connection or coupling between two or more elements and may include the presence of one or more intermediate elements between two elements which are "connected" or "coupled". The coupling or the connection between the elements may be physical, logical, or a combination thereof. For example, "connection" may be replaced with "access". In a case of using in the present disclosure, two elements may be considered to be "connected" or "coupled" with each other using at least one of one or more electric wires, cables and/or a printed electrical connection or using electromagnetic energy having a wavelength in a radio frequency domain, a microwave region, or a light (both visible and invisible) region as non-limiting and non-exhaustive examples.

A reference signal may be abbreviated as RS (Reference Signal) and may be referred to as a pilot, depending on the standard that is applied.

The phrase "based on" used in the present disclosure is not limited to "based only on" unless otherwise stated. In other words, the phrase "based on" means both "based only on" and "based at least on".

Any reference to an element using a designation such as "first" or "second", used in the present disclosure, does not generally restrict quantities or the order of those elements. Such designation can be used in the present disclosure as a convenient method of distinguishing between two or more elements. Thus, reference to the first and second elements does not mean that only two elements can be adopted there, or the first element must precede the second element in a certain way.

Furthermore, "means" in the configuration of each of the above devices may be replaced with "unit", "circuit", "device", or the like.

When "include", "including", and variations thereof are used in the present disclosure, these terms are intended to be comprehensive, similar to the term "provided with (comprising)". Furthermore, the term "or" used in the present disclosure is intended not to be an exclusive OR.

A radio frame may include one or more frames in the time domain. In the time domain, each of one or more frames may be referred to as a subframe. The subframe may further include one or more slots in the time domain. The subframe may have a fixed time length (for example, 1 ms) not depending on numerology.

Numerology may be a communication parameter applied to at least one of transmission and reception of a certain signal or channel. For example, numerology may indicate at least one of subcarrier spacing (SCS: SubCarrier Spacing), the bandwidth, the symbol length, the cyclic prefix length, the transmission time interval (TTI: Transmission Time Interval), the number of symbols per TTI, the radio frame configuration, a specific filtering process performed in the frequency domain by a transceiver, a specific windowing process performed in the time domain by a transceiver, and the like.

A slot may include one or more symbols (OFDM (Orthogonal Frequency Division Multiplexing) symbols, SC-FDMA (Single Carrier Frequency Division Multiple Access) symbols, etc.) in the time domain. A slot may be a time unit based on numerology.

A slot may include a plurality of mini slots. Each mini slot may include one or more symbols in the time domain. Furthermore, a mini slot may be referred to as a sub-slot. A mini slot may include fewer symbols than a slot. PDSCH (or PUSCH) that is transmitted in a unit of time greater than a mini slot may be referred to as PDSCH (or PUSCH) mapping type A. PDSCH (or PUSCH) that is transmitted using a mini slot may be referred to as PDSCH (or PUSCH) mapping type B.

Any one of a radio frame, a subframe, a slot, a mini slot, and a symbol indicates a time unit for transmitting a signal. As a radio frame, a subframe, a slot, a mini slot, and a symbol, different names corresponding to them may be used.

For example, one subframe may be referred to as a transmission time interval (TTI: Transmission Time Interval), or a plurality of consecutive subframes may be referred to as a TTI, or one slot or one mini slot may be referred to as a TTI. In other words, at least one of the subframe and the TTI may be a subframe (1 ms) in conventional LTE, may be a period shorter than 1 ms (for example, 1 to 13 symbols), or may be a period longer than 1 ms. A unit representing the TTI may be referred to as a slot, a mini slot, or the like, instead of a subframe.

Here, for example, the TTI refers to a minimum time unit of scheduling in wireless communication. For example, in an LTE system, the base station performs scheduling of allocating radio resources (frequency bandwidth, transmission power, or the like which can be used in each terminal 20) to each terminal 20 in units of TTIs. The definition of the TTI is not limited thereto.

The TTI may be a transmission time unit such as a channel-coded data packet (transport block), a code block, or a codeword, or may be a processing unit of, for example, scheduling or link adaptation. Furthermore, when a TTI is provided, the time interval (for example, the number of symbols) in which a transport block, a code block, a codeword, or the like is actually mapped, may be shorter than the TTI.

When one slot or one mini slot is referred to as a TTI, one or more TTIs (that is, one or more slots or one or more mini slots) may be a minimum time unit of scheduling. Furthermore, the number of slots (the number of mini slots) forming the minimum time unit of scheduling may be controlled.

A TTI having a time length of 1 ms may be referred to as a common TTI (TTI in LTE Rel. 8 to 12), a normal TTI, a long TTI, a common subframe, a normal subframe, a long subframe, a slot, or the like. A TTI shorter than a common TTI may be referred to as a reduced TTI, a short TTI, a partial TTI (a partial or fractional TTI), a reduced subframe, a short subframe, a mini slot, a sub slot, a slot, or the like.

Furthermore, a long TTI (for example, a normal TTI, a subframe, etc.) may be replaced with a TTI having a time length exceeding 1 ms, and a short TTI (for example, a reduced TTI or the like) may be replaced with a TTI having a TTI length that is shorter than a TTI length of a long TTI and that is longer than or equal to 1 ms.

The resource block (RB) is a resource allocation unit in the time domain and the frequency domain, and may include one or more consecutive subcarriers in the frequency domain. The number of subcarriers included in an RB may be the same, irrespective of the numerology and may be, for example, 12. The number of subcarriers included in an RB may be determined based on numerology.

Furthermore, the time field of an RB may include one or more symbols and may have a length of one slot, one mini slot, one subframe, or one TTI. One TTI, one subframe, or the like may be formed with one or more resource blocks.

Furthermore, one or more RBs may be referred to as a physical resource block (PRB: Physical RB), a subcarrier group (SCG: Sub-Carrier Group), a resource element group (REG: Resource Element Group), a PRB pair, an RB pair, or the like.

Furthermore, a resource block may be formed with one or more resource elements (REs: Resource Elements). For example, one RE may be a radio resource field of one subcarrier and one symbol.

A bandwidth part (BWP: Bandwidth Part) (which may be referred to as a partial bandwidth or the like) may indicate a subset of consecutive common resource blocks (RBs) for a certain numerology in a certain carrier. Here, a common RB may be specified by an index of an RB based on a common reference point of a carrier. A PRB may be defined in a BWP and numbered in a BWP.

The BWP may include BWP for UL (UL BWP) and BWP for DL (DL BWP). In the terminal 20, one or more BWPs may be configured in one carrier.

At least one of configured BWPs may be active, and the terminal 20 need not assume that predetermined signals/channels are transmitted and received outside an active BWP. Furthermore, a "cell", a "carrier", or the like in the present disclosure may be replaced with a "BWP".

Structures of the radio frame, the subframe, slot, the mini slot, and the symbol are merely examples. For example, configurations such as the number of subframes included in a radio frame, the number of slots per subframe or radio frame, the number of mini slots included in a slot, the number of symbols and RBs included in a slot or a mini slot, the number of subcarriers included in an RB, the number of symbols in a TTI, the symbol length, the cyclic prefix (CP: Cyclic Prefix) length, and the like can be variously changed.

In the present disclosure, for example, when an article such as "a", "an", or "the" in English is added by a translation, the present disclosure may include a case in which a noun following the article is the plural.

In the present disclosure, "A and B are different" may mean "A and B are different from each other". However, this may also mean "A and B are different from C". Terms such as "separated" or "combined" may be interpreted as well as "different".

Each aspect/embodiment described in the present disclosure may be used alone, in combination, or may be switched in accordance with the implementation. Furthermore, notification of predetermined information (for example, notification of "being X") is not limited to notification performed explicitly, but may be performed implicitly (for example, not notifying the predetermined information).

Although the present disclosure is described above in detail, it is obvious to those skilled in the art that the present disclosure is not limited to the embodiment described in the present disclosure. The present disclosure may be implemented as revised and modified embodiments without departing from the gist and scope of the present disclosure as set forth in the accompanying claims. Accordingly, the description of the present disclosure is for the purpose of illustration and does not have any restrictive meaning to the present disclosure.

DESCRIPTION OF THE REFERENCE NUMERALS

10 Base station
110 Transmitting unit
120 Receiving unit
130 Configuration unit
140 Control unit
20 Terminal
210 Transmitting unit
220 Receiving unit
230 Configuration unit
240 Control unit
1001 Processor
1002 Storage device
1003 Auxiliary storage device
1004 Communication device
1005 Input device
1006 Output device

The invention claimed is:

1. A terminal comprising:

a receiver that receives, from a base station, downlink control information that indicates both switching of a search space set or a search space set group and skipping of PDCCH (Physical Downlink Control Channel) monitoring for a predetermined period; and a processor that performs, based on the downlink control information, at least one of the switching of the search space set or the search space set group, or the skipping of PDCCH monitoring for the predetermined period, wherein a single parameter included in the downlink control information indicates the switching of the search space set or the search space set group and indicates the skipping of the PDCCH monitoring for the predetermined period, and wherein the predetermined period is different depending on a value of the parameter.

2. The terminal according to claim 1, wherein the receiver further receives, from the base station, delay information indicating a time to delay a start of the switching of the search space set or the search space set group, and the processor performs the switching of the search space set or the search space set group after the time indicated by the delay information has elapsed from reception of the downlink control information.

3. The terminal according to claim 1, wherein a time from reception of the downlink control information to a start of the skipping of the PDCCH monitoring is different from a time from the reception of the downlink control information to a start of the switching of the search space set or the search space set group.

4. The terminal according to claim 1, wherein:

the receiver further receives, from the base station, information indicating a duration for which the PDCCH monitoring is skipped, and the processor determines the predetermined period based on the duration indicated by the information and the value of the parameter included in the downlink control information.

5. A communication method performed by a terminal, the communication method comprising:

receiving, from a base station, downlink control information that indicates both switching of a search space set or a search space set group and skipping of PDCCH (Physical Downlink Control Channel) monitoring for a predetermined period; and performing, based on the downlink control information, at least one of switching of the search space set or the search space set group, or skipping of PDCCH monitoring for the predetermined period, wherein a single parameter included in the downlink control information indicates the switching of the search space set or the search space set group and indicates the skipping of the PDCCH monitoring for the predetermined period, and wherein the predetermined period is different depending on a value of the parameter.

* * * * *